United States Patent [19]

Anthony et al.

[11] 4,356,221

[45] Oct. 26, 1982

[54] MELT-EXTRUDED MULTILAYER POLYETHYLENE BAG FILM

[75] Inventors: John Anthony, Downers Grove; Frank J. Velisek, Westmont, both of Ill.; Paul D. Capponi, Wayne, N.J.

[73] Assignee: Union Carbide Corporation, Danbury, Conn.

[21] Appl. No.: 264,101

[22] Filed: May 15, 1981

[51] Int. Cl.³ .................... B65D 31/00; B32B 27/08
[52] U.S. Cl. .................... 428/35; 428/216; 428/516; 229/53
[58] Field of Search ............ 428/35, 216, 516

[56] References Cited

U.S. PATENT DOCUMENTS

| | | | |
|---|---|---|---|
| 3,088,848 | 5/1963 | Tritsch | 117/122 |
| 3,281,501 | 10/1966 | Coats et al. | 260/897 |
| 3,340,328 | 9/1967 | Brindell et al. | 260/897 |
| 3,409,574 | 11/1968 | Gros | 260/23 |
| 3,700,759 | 10/1972 | Breuer et al. | 260/897 A |
| 3,888,709 | 6/1975 | Burk | 156/48 |
| 4,160,053 | 7/1979 | Clayton | 428/516 |

FOREIGN PATENT DOCUMENTS 50-86750  6/1980  Japan .................. 428/516

OTHER PUBLICATIONS

"The Real Economics of LLDPE Film Extrusion," *Modern Plastics*, Jul. 1980, pp. 42–45.

"Processing the Linear LDPE's: There Are Some Differences," *Processing Engineering News*, Feb. 1980, pp. 33, 35, 37, 41, 43, 45, 115, 117.

*Primary Examiner*—P. Ives
*Attorney, Agent, or Firm*—Real J. Grandmaison; John C. LeFever; Harrie M. Humphreys

[57] ABSTRACT

A multi-layer polyethylene film especially suitable for garbage and refuse bags, comprising a first layer of at least 75 wt. % high pressure-low density polyethylene (HPLPDE), and at least a second layer of HPLDPE and low pressure-low density polyethylene (LPLDPE), in which the LPLDPE is less than about 25 wt. % of the LPLDPE plus HPLDPE total weight.

18 Claims, 3 Drawing Figures

MELT-EXTRUDED MULTILAYER POLYETHYLENE BAG FILM

BACKGROUND OF THE INVENTION

1. Field of the Invention

This invention relates to a multi-layer plastic film formed from polyethylene, which is especially suited for manufacture of garbage and trash bags.

2. Description of the Prior Art

Plastic bags for bulk material such as garbage may be produced in film form from various polymers including low density polyethylene. The desirable properties of polyethylene plastic bags include high strength characteristics such as puncture toughness, tensile strength and Elmendorf tear strength. Another desirable property of polyethylene plastic bags is low manufacturing cost. It will be recognized that the required quantity of raw material may be reduced by use of film having the previously mentioned high strength characteristics, and in part for this reason, multiple layer plastic films have been used to manufacture garbage bags.

Extruders are used to process the raw material from which the film is formed. Other desirable characteristics of polyethylene film bags are low extruder power requirements and head pressure.

With the introduction of "linear" low density polyethylenes made by the low pressure processes (hereinafter referred to as "LPLDPE"), attempts have been made to substitute this material for film applications in place of conventional highly branched low density polyethylenes made by high pressure processes (hereinafter referred to as "HPLDPE"). The reason for these efforts is that LPLDPE is widely recognized as being tougher and stronger than HPLDPE (reference: "Process Engineering News," February 1980, pg. 33). However, LPLDPE is also recognized by the art as being in some respects more difficult to process than HPLDPE. That is, the extruder power requirements and head pressure are substantially higher for LPLDPE than HPLDPE film manufacture. Also, it has been discovered that the machine direction (MD) Elmendorf tear strength for LPLDPE film is substantially lower than HPLDPE film, even though other physical properties of LPLDPE are superior.

The prior art polyethylene film-type bags have thus been characterized by either limited strength properties except high MD tear strength, and relatively low extruder power requirement and low extruder head pressure on one hand, or high strength properties but only moderate MD tear strength, relatively high extruder power requirement and high extruder head pressure on the other hand.

Accordingly, it is an object of this invention to provide a multi-layer polyethylene film which has high strength properties including adequate MD tear strength, low extruder power requirement and low extruder head pressure.

This and other objects of the invention will be apparent from the following description, the appended claims, and the drawings in which:

SUMMARY OF THE INVENTION

Figure 1:
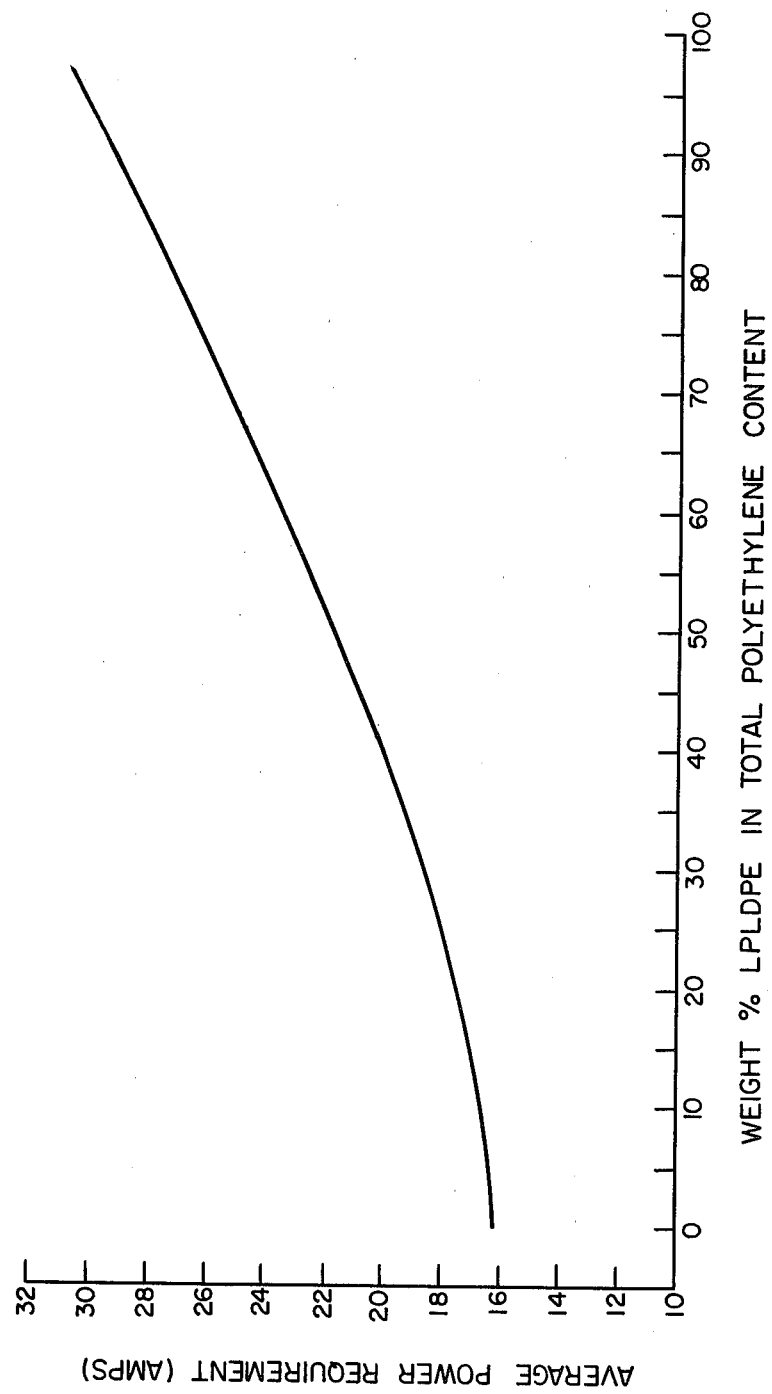
FIG. 1 is a graph showing the average power requirement (in amperes) for extruding various blends of HPLDPE and LPLDPE prior to polyethylene film formation therefrom.

In this invention, a multi-layer polyethylene film is provided comprising a first outer layer of at least about 75 wt.% high pressure-low density polyethylene (HPLDPE), and at least one mixture of HPLDPE and low pressure-low density polyethylene (LPLDPE) comprising all other layers but including at least a second outer layer.

The HPLDPE in the other layers (including at least the second outer layer) has melt index between about 1 and 4 gms/10 minutes and density below about 0.93 gms/cm$^3$. The LPLDPE in these other layers has melt index below about 3 gms/10 minutes and density below about 0.93 gms/cm$^3$. The LPLDPE is less than about 25 wt.% of the LPLDPE plus HPLDPE total weight in the other layers (excluding the first layer). The thickness ratio of all other layers/first outer layer is between about ⅓ and about 3/1, and the total thickness of the film is between about 1 and about 3 mils.

The multi-layer film of this invention may, for example, be in the form of two layers with the first layer comprising at least about 75% HPLDPE and the second layer comprising a blend of HPLDPE and LPLDPE in the aforedescribed range. If fabricated as a bag, the LPLDPE-HPLDPE second layer is preferably on the outside and the HPLDPE first layer on the inside of the bag.

In another embodiment, the multi-layer film of this invention is in the form of three layers, with second and third layers each satisfying the aforedescribed melt index and density requirements for LPLDPE and HPLDPE in the other than first layer, as well as the LPLDPE wt.% requirement. In this instance, the second layer is an outer layer and the third layer is the middle or core layer. The second and third layers may or may not be identical.

As will be demonstrated by comparative tests discussed hereinafter, films of this invention may be manufactured with substantially lower extruder power requirement and extruder head pressure than film formed from LPLDPE/HPLDPE blends with higher LPLDPE content or 100% LPLDPE film. Yet it will also be demonstrated that the present film has substantially higher puncture toughness and tensile strength characteristics than 100% HPLDPE film, but substantially superior Elmendorf MD tear strength than LPLDPE/HPLDPE blends up to about 60 wt.% LPLDPE.

DESCRIPTION OF THE PREFERRED EMBODIMENT

It will be recalled that in the practice of this invention, the HPLDPE in the HPLDPE/LPLDPE other-than-first layer(s) should have a melt index or melt indices between about 1 and 4 gms/10 minutes. Melt indices below about 1 result in poorer performance with respect to puncture toughness energy. Also, drawdown (the ability to form thin film from the melt) diminishes with melt indices below about 1. If the HPLDPE melt index exceeds about 4, certain physical properties also diminish, i.e. impact strength, tensile strength and puncture toughness. Also, the density of the HPLDPE should be below about 0.93 gms/cm$^3$ to avoid poorer physical properties in the multilayer film. In particular, MD tear strength and impact strength decline with higher HPLDPE densities. Best physical properties are provided when the other-than-first layer(s) HPLDPE melt index or melt indices are between about 1.5 and 3, and the HPLDPE density or densities are between about 0.916 and 0.928. These represent preferred embodiments of the invention.

As will be demonstrated by comparative tests, the LPLDPE should comprise less than about 25 wt.% of the LPLDPE plus HPLDPE total weight in the other-than-first layer(s), to avoid prohibitively low machine direction (MD) tear strength and excessively high extruder power and head pressure requirements. Also, the LPLDPE in the other-than-first layer(s) has melt index below about 3 gms/10 minutes to achieve acceptable physical properties in the multi-layer film. The film physical properties of tensile strength and impact strength both decline with increasing LPLDPE melt index. Also, Elmendorf (MD) tear strength, tensile energy, elongation percent (MD), and bag drop measurements also progressively decline with increasing LPLDPE melt index within this range. Moreover, higher melt index LPLDPE resins tend towards bubble instability during the film blowing step because of their lower extensional viscosity than HPLDPE. On the other hand, excessively low melt index LPLDPE can result in poor dispersion and mixing with higher melt index HPLDPE. For these reasons, the LPLDPE melt index in the LPLDPE-HPLDPE blend layers is preferably between about 0.6 and 1.2.

As previously stated, the LPLDPE density should be below about 0.93 gms/cm$^3$. This is because higher densities tend to produce undesirably stiff films and less desirable physical properties, e.g. MD tear strength and puncture toughness. On the other hand, certain physical properties such as yield strength also tend to be inferior if the LPLDPE density is very low. For these reasons, the LPLDPE density is preferably between about 0.916 and 0.923.

The first outer layer comprises at least 75 wt.% HPLDPE and may contain a relatively low wt.% of LPLDPE If waste LPLDPE/HPLDPE blend material from previous runs is melted and reused as "self-reclaim". This LPLDPE is preferably less than about 12 wt.% to avoid the trends of increasing extruder average power requirement (FIG. 1), increasing extruder average head pressure (FIG. 2), and decreasing MD tear strength (FIG. 3). A further consideration is that melt fracture is avoided with 100% HPLDPE, and progressively increases with increasing LPLDPE content. Accordingly, a potential melt fracture problem in the first outer layer is minimized with relatively high HPLDPE content such as 75 wt.%.

The first outer layer also contains a relatively low percentage of other than polyethylene material such as slip and anti-block compounds and color pigment, and the total of these materials does not normally exceed about 3 wt.%. For the same reasons, the first outer layer preferably comprises at least 82 wt.% HPLDPE.

The other layers/first layer thickness ratio should be between about ½ and about 3/1. Lower ratios than ½ do not contain sufficient LPLDPE in the total film structure to significantly improve the puncture toughness and tensile strength of the film. On the other hand, ratios above about 3/1 do not contain a sufficient quantity of the first outer layer to utilize "self reclaim" in the proportions required or sufficient HPLDPE to yield satisfactory high MD tear strength. The layer thickness ratio is preferably between about 1.5/1 and 2.5/1 as a balance of these opposing considerations.

The total thickness of the two-layer film is between about 1 and about 3 mils. Substantially thinner films would not be suitable because the strength properties of the film would be unacceptably low for use as a bag. Films substantially thicker than 3 mils are undesirable since the additional strength associated with thicker material is not needed for trash-garbage bag usage. A further disadvantage of thicker films would be difficulty in handling and tying the bag open end. A preferred balance of these opposing considerations is a film between about 1.3 and 1.8 mils thick.

A preferred embodiment of the invention is a two-layer polyethylene film bag comprising a first inner layer of at least 82 wt.% HPLDPE and a second outer layer comprising a mixture of HPLDPE and LPLDPE, wherein the HPLDPE has melt index of about 2 gms/10 minutes and density of about 0.92 gms/cm$^3$, said LPLDPE is about 18 wt.% of the LPLDPE plus HPLDPE total weight in said second layer, with second layer/first layer thickness ratio about 2:1, and the total thickness of the film is about 1.5 mils.

High pressure low density polyethylene (HPLDPE) has been commercially available for many years and the highly branched homopolymer is made with a free radical catalyst at pressures typically above 15,000 psi, usually in elongated tubular reactors.

Low pressure low density polyethylene (LPLDPE) has only been commercially available for a few years, and is more linear and less chain branched than HPLDPE. LPLDPE is typically made at 150 to 400 psi. in the gas phase, by copolymerizing ethylene as the major constituent and $C_3$-$C_8$ alpha monoolefins as the minor constituent comonomer, with heterogeneous catalysts based on transition metal compounds of variable valence. Methods for manufacturing representative types of LPLDPE are described in Levin U.S. Pat. No. 4,011,382 and European Patent Application No. 79-100958.2. LPLDPE generally possesses little, if any, long chain branching and the only branching to speak of its short chain branching. Branch length is controlled by comonomer type. Branch frequency is controlled by the concentration of comonomer(s) used during copolymerization. Branch frequency distribution is influenced by the nature of the transition metal catalyst used during the copolymerization process.

The LPLDPE density may be controlled by the type of comonomers used to introduce limited branching. These may for example include butene-1, so that the LPLDPE is a copolymer of ethylene and butene-1. As another example, the comonomer may be hexene-1 and either propylene or butene-1, so that the LPLDPE is a terpolymer comprising ethylene, hexene-1 and either propylene or butene-1. The terpolymer type of LPLDPE is described more completely in European Patent Application No. 0 021 605.

EXAMPLE 1

A series of experiments was performed to demonstrate the effect of adding LPLDPE to HPLDPE on extruder power and head pressure characteristics. Although these experiments involved a single layer film, the general relationships demonstrated are applicable to the multiple layer polyethylene films of this invention.

Two extruders of the single screw type were used: a 2½ inch (barrel diameter), 24:1 L/D unit operated at a screw speed of 11 RPM, and a 1½ inch, 28:1 L/D unit operated at a screw speed of 35 RPM. The temperature profile of both extruders was set at 320° F. in the hopper zone, increasing to 380° F. at the head. The extruder heads, elbows, pipes and the die lower portion was set at 380° F. and the die upper portion was set at 390° F. The melt temperature in the 2½ inch extruder ranged between 335° F. and 364° F., and the melt temperature in the 1½ inch extruder was in the range of 375°–389° F. The total output rate from the two extruders was about 30 lbs/hrs. and the extrudate was upwardly fed through a 4 inch diameter annular die slot with a 50 mil lip opening. This extrudate was formed into a bubble by air inflation. The bubble frost line was about 10 inches above the die and the blow ratio was 3:1 (film flat width to die diameter). The nip roll speed was 34–38 rpm. and the film thickness was 1.5 mils.

In these experiments, the LPLDPE had a 1.0 melt index and 0.918 density, whereas the HPLDPE had a 2.1 melt index and a 0.918 density. The mixtures comprised on a weight basis, 97% polyethylene, 0.7% slip, antiblock, processing aid and antioxidant compounds of the type well-known to those skilled in the art, and 2.3% colorants.

Figure 2:
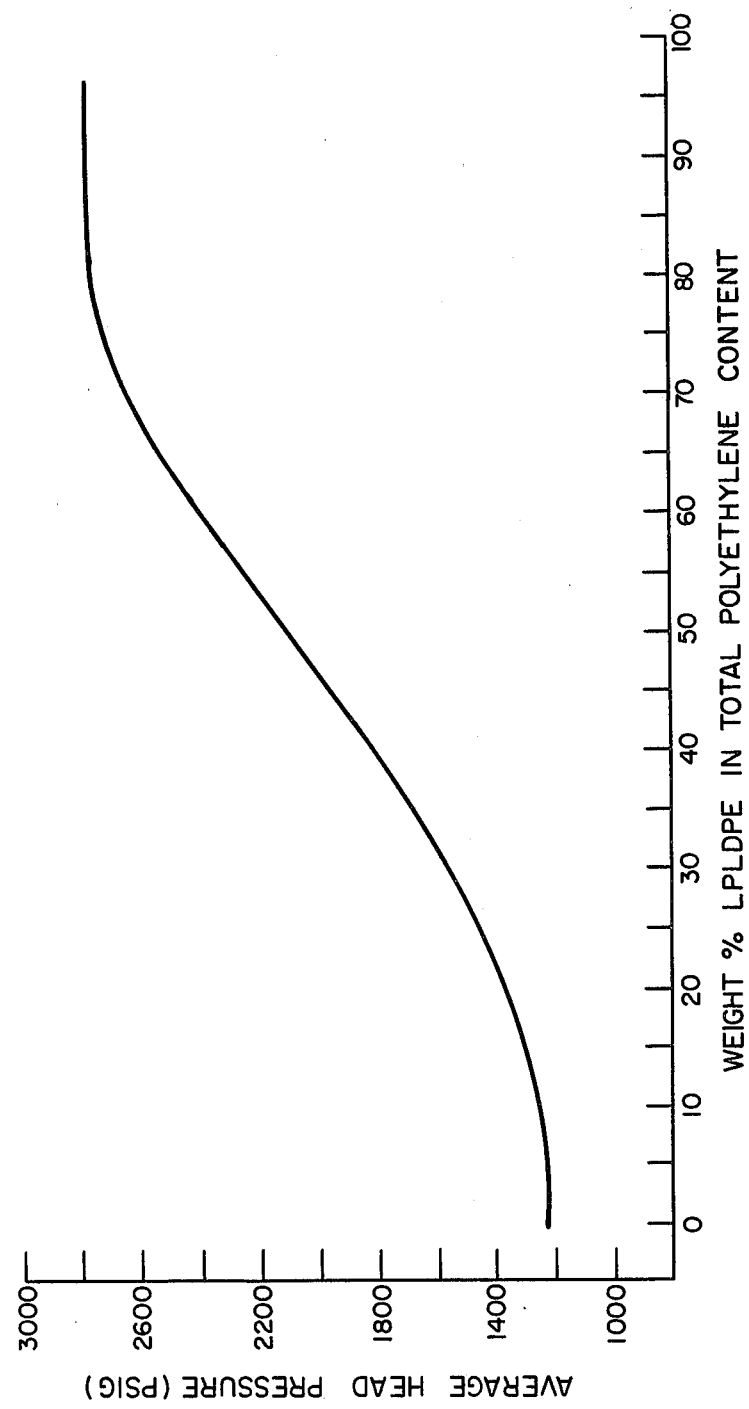
FIG. 2 is a graph showing the average head pressure (in psig) for extruding the same HPLDPE-LPLDPE blends as in FIG. 1.
Figure 3:
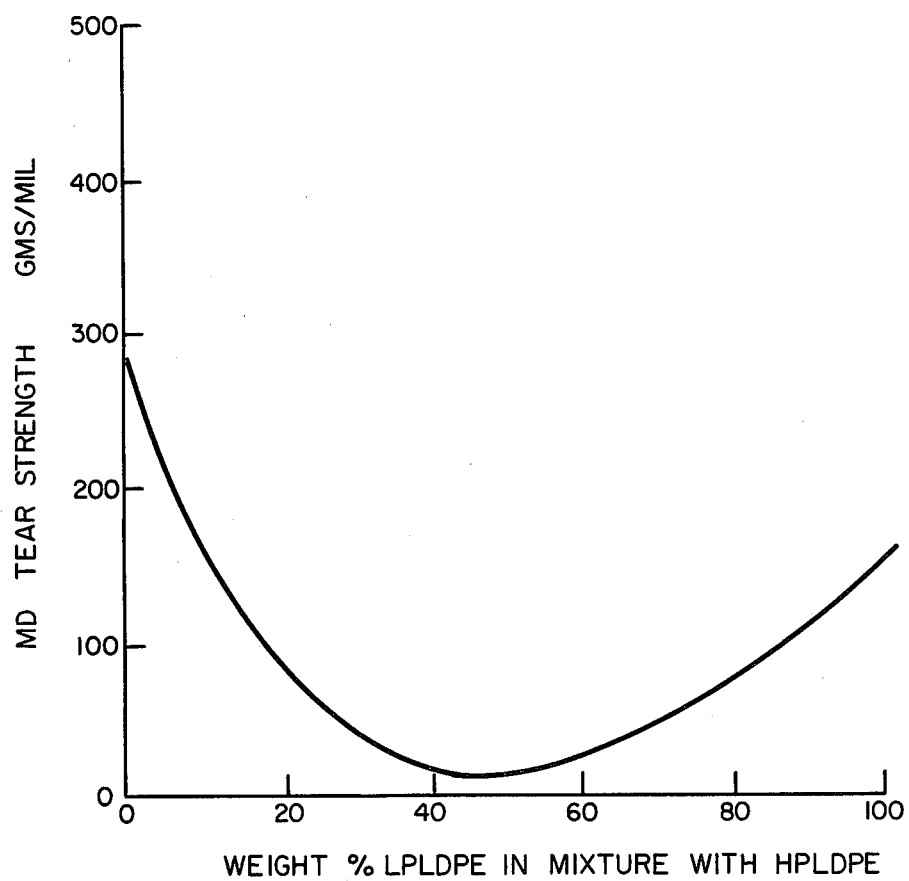
FIG. 3 is a graph showing the machine direction Elmendorf tear strength for films formed from the HPLDPE-LPLDPE blends used in FIGS. 1 and 2.

The results of the Example 1 experiments are summarized in Table A, and shown in the graphs of FIGS. 1 and 2. The latter are computer simulations based on the experimental data.

Inspection of FIG. 1 indicates that the average power requirement is fairly constant, with at most only a slightly positive slope, up to the region of about 25 wt.% LPLDPE. In the latter regions the average power requirement begins to increase at a substantial and approximately constant and greater rate with increasing LPLDPE content, and this trend continues up to 100 wt.% LPLDPE.

Inspection of FIG. 2 indicates that as in FIG. 1, the average head pressure is fairly constant, with at most only a slightly positive slope, up to the region of about 25 wt.% LPLDPE. In the latter region the average head pressure begins to increase at a substantial and approximately constant rate with increasing LPLDPE up to about 65 wt.% LPLDPE. At higher concentrations of LPLDPE the average head pressure does not increase above about 2750 psig.

Table A and FIGS. 1 and 2 can be seen as supporting the requirement of this invention that the polyethylene contains LPLDPE in an amount which is less than about 25 wt.% of the LPLDPE plus HPLDPE total weight in the second layer or layers other than the first layer. Another reason for this requirement is that the tendency towards melt fracture increases with increasing LPLDPE content.

TABLE A

| | Power and Head Pressure Requirements | | | | | |
|---|---|---|---|---|---|---|
| | | | 2½ Inch Extruder | | 1½ Inch Extruder | |
| Mixture No. | LPLDPE* wt % | HPLDPE* wt % | Amps | Pressure | Amps | Pressure |
| 1 | — | 100.0 | 15 | 1300 | 16.5 | 1000 |
| 2 | 5.2 | 94.8 | 16 | 1400 | 16.5 | 1050 |
| 3 | 10.3 | 89.7 | 17 | 1350 | 18.5 | 1450 |
| 4 | 15.5 | 84.5 | 17 | 1100 | 18.5 | 1550 |
| 5 | 20.6 | 79.4 | 17 | 1000 | 17 | 1450 |
| 6 | 30.9 | 69.1 | 17.5 | 1250 | 19.5 | 1900 |

TABLE A-continued

| | Power and Head Pressure Requirements | | | | | |
|---|---|---|---|---|---|---|
| | | | 2½ Inch Extruder | | 1½ Inch Extruder | |
| Mixture No. | LPLDPE* wt % | HPLDPE* wt % | Amps | Pressure | Amps | Pressure |
| 7 | 41.2 | 58.8 | 19 | 1400 | 19.5 | 2200 |
| 8 | 51.5 | 48.5 | 23 | 1900 | 22.5 | 2450 |
| 9 | 51.5 | 48.5 | 22 | 1700 | 21.5 | 2100 |
| 10 | 77.3 | 22.7 | 26 | 2500 | 26 | 2950 |
| 11 | 83.4 | 16.6 | 28 | 2500 | 27 | 2600 |
| 12 | 91.0 | 9.0 | 29 | 2600 | 28.5 | 2700 |
| 13 | 93.6 | 6.4 | 30 | 2700 | 29.5 | 2700 |
| 14 | 97.6 | 2.4 | 32 | 2600 | 30.5 | 2700 |

*Percent of total Polyethylene in mixture. Pigment, slip agent, anti-block, processing aid and antioxidant comprise an additional 3% of the total mixture weight.

EXAMPLE II

Another series of experiments was performed which demonstrates the effect of adding LPLDPE to HPLDPE on certain physical properties; i.e. puncture toughness and tensile strength. The films used in these experiments are the same films prepared in Example I. The data from these tests are summarized in Table B. In general, the puncture toughness energy and tensile strength (both MD and TD) increase with increasing LPLDPE content. Graphs of the Table B data show that these relationships are approximately linear. With respect to puncture toughness load, Table B indicates that the values in the preferred range of 16-22 Wt.% of LPLDPE are relatively high.

TABLE B

| | Effect of LPLDPE on Film Physical Properties | | | | |
|---|---|---|---|---|---|
| | | Puncture Toughness | | Tensile Strength psi | |
| Mixture No. | Wt. % LPLDPE in PE Total | Load lb/mil | Energy in-lbs/mil | MD | TD |
| 1 | 0 | 3.8 | 3.0 | 3330 | 2025 |
| 2 | 5.2 | 3.8 | 3.0 | 3425 | 2100 |
| 3 | 10.3 | 4.1 | 3.4 | 3650 | 2190 |
| 4 | 15.5 | 4.7 | 3.7 | 3700 | 2070 |
| 5 | 20.6 | 4.2 | 3.1 | 3600 | 1960 |
| 6 | 30.9 | 4.4 | 3.6 | 3570 | 2320 |
| 7 | 41.2 | 4.1 | 3.5 | 3500 | 2490 |
| 8 | 51.2 | 4.3 | 4.0 | 3460 | 2660 |
| 9 | 51.2 | 3.6 | 3.0 | 3340 | 2860 |
| 10 | 77.3 | 3.8 | 3.7 | 4190 | 3410 |
| 11 | 83.4 | 4.5 | 5.5 | 4050 | 3000 |
| 12 | 91.0 | 3.2 | 3.3 | 3390 | 2680 |
| 13 | 93.6 | 3.4 | 4.0 | 3650 | 2640 |
| 14 | 97.6 | 3.6 | 4.4 | 3790 | 2670 |

EXAMPLE III

Another series of experiments was performed in which the (MD) Elmendorf tear strength was determined for the same mixture Nos. 1–14 of Examples I and II. These data are summarized in Table C. Also, FIG. 3 is an analysis and projection of the data based on a mathematical model.

TABLE C

| | Effect of LPLDPE on MD Elmendorf Tear Strength | |
|---|---|---|
| Mixture No. | Wt. % LPLDPE in PE total | Tear Strength Gms/mil |
| 1 | 0 | 300 |
| 2 | 5.2 | 241 |
| 3 | 10.3 | 170 |
| 4 | 15.5 | 44 |

TABLE C-continued

Effect of LPLDPE on MD Elmendorf Tear Strength

| Mixture No. | Wt. % LPLDPE in PE total | Tear Strength Gms/mil |
|---|---|---|
| 5 | 20.6 | 124 |
| 6 | 30.9 | 16 |
| 7 | 41.2 | 28 |
| 8 | 51.2 | 28 |
| 9 | 51.2 | 24 |
| 10 | 77.3 | 65 |
| 11 | 83.4 | 69 |
| 12 | 91.0 | 114 |
| 13 | 93.6 | 113 |
| 14 | 97.6 | 128 |

Inspection of the Table C data and FIG. 3 reveals that the addition of relatively small proportions of LPLDPE to the HPLDPE (on the order of 5 wt.%) substantially reduces the film MD tear strength from the initially high value for 100% HPLDPE. This loss of MD tear strength continues with increasing LPLDPE proportion but at progressively lesser rates until a minimum is reached at about 40 wt.% LPLDPE, where the slope of the curve begins to increase with increases of LPLDPE proportion. The reasons for these relationships are not understood.

An MD tear strength value of at least 67 gms/mil is considered commercially acceptable, and this value may be achieved with less than about 25 wt.% LPLDPE of the LPLDPE plus HPLDPE total weight.

In a preferred embodiment of the invention, the LPLDPE is between about 16 wt.% and about 22 wt.% of the LPLDPE plus HPLDPE total weight in the first layer. This range provides relatively high film MD tear strength (FIG. 3) at relatively low extruder power and head pressure (FIGS. 1 and 2).

EXAMPLE IV

A further series of tests was performed comparing the physical properties of a two layer film of this invention with a prior art two layer film in which both layers were formed from HPLDPE with a melt index of about 2 gms/10 minutes and a density of about 0.92 gms/cm³. In each instance the tests were performed on a substantial number of two-layer film samples manufactured on equipment used in full-scale commercial production. Both two layer films were 1.5 mils thick and the thickness ratio was 2 (second outer layer): 1 (first outer layer). For the invention embodiment, the second outer layer contained LPLDPE in an amount comprising 18 wt.% of the LPLDPE plus HPLDPE total weight, and the PE mixture comprised 98.2 wt.% of the second outer layer total weight. The remainder was pigment (1.1 wt.%), slip and antiblock compounds (0.7 wt.%) of the previously described type. The LPLDPE had melt index of about 1 and density of about 0.92. The HPLDPE in the first and second outer layers had melt index of about 2 and density of about 0.92. The prior art HPLDPE film was identical in all respects except that it contained no LPLDPE.

In each instance the extruder used to form the outer layer was typically a 6 inch single screw machine with a 24:1 L/D ratio, operated at 70 RPM screw speed and 4500 psi head pressure with two die paths. The extruder used to form the inner layer was a 4½ inch single screw machine having a 24:1 L/D ratio operated at 90-100 RPM screw speed and 6000 psi head pressure. The barrel temperature was 290°-300° F. and the melt temperature was 360°-385° F. for each extruder. The die receiving the two extrudates had an annular slot with a 40 mil lip opening, while the die temperature was 300°-310° F. The discharge from the die was air blown into a multi-layer film having a 108 inch flat width. From the standpoint of die paths, the resulting film comprises three layers because there were two LPLDPE/HPLDPE die paths and one HPLDPE die path. From the standpoint of composition, the resulting film comprises two layers, because the composition in the two LPLDPE/HPLDPE die paths was identical.

The physical properties of the two types of two-layer films are summarized in Table D.

TABLE D

Comparison with all HPLDPE Film

| | All HPLDPE Two Layer | | LPLDPE/HPLDPE in Outer Layer | | |
|---|---|---|---|---|---|
| | Number Bags Tested | | | | |
| | 56 | | 210 | | |
| | Mean | Std. Dev. | Mean | Std. Dev. | Percent Change |
| Tensile Strength (PSI) MD | 3217 | 241 | 3776 | 332 | +17.4 |
| TD | 1841 | 125 | 2133 | 107 | +15.9 |
| Puncture Toughness Load (lbs) | 7.11 | 0.77 | 8.82 | 1.16 | +24.0 |
| Energy (in lbs) | 6.29 | 1.00 | 8.35 | 1.58 | +32.8 |

Inspection of Table D reveals that the tensile strength and puncture toughness are each substantially higher for this invention as compared with an all HPLDPE two-layer film.

Although preferred embodiments of this invention have been described in detail, it is contemplated that modifications thereof may be made and that some features may be employed without others, all within the spirit and scope of the invention. For example, although the films described in the foregoing examples were prepared by bubble extrusion, other preparative methods may be used as, for example, slot cast extrusion.

What is claimed is:

1. A melt-extruded multilayer polyethylene film consisting essentially of a first outer layer containing at least about 75 percent by weight, based on the weight of said first outer layer, of high pressure, low density polyethylene, and at least a second outer layer comprising a mixture of high pressure, low density polyethylene and low pressure, low density polyethylene, said high pressure, low density polyethylene and said low pressure, low density polyethylene having a density below about 0.93 grams per cubic centimeter.

2. A multilayer polyethylene film according to claim 1 wherein said high pressure, low density polyethylene has a melt index of between about 1 and about 4 grams per 10 minutes.

3. A multilayer polyethylene film according to claim 1 wherein said low pressure, low density polyethylene has a melt index below about 3 grams per 10 minutes.

4. A multilayer polyethylene film according to claim 1 wherein said low pressure, low density polyethylene is present in said second outer layer in an amount of less than about 25 percent by weight based on the weight of said second outer layer.

5. A multilayer polyethylene film according to claim 1 wherein the thickness ratio of said second outer layer to said first outer layer is between about 1:2 and about 3:1, and the total thickness of said film is between about 1 mil and about 3 mils.

6. A multilayer polyethylene film according to claim 1 wherein said high pressure, low density polyethylene has a density of between about 0.916 and about 0.928 grams per cubic centimeter.

7. A multilayer polyethylene film according to claim 1 wherein said low pressure, low density polyethylene has a melt index of between about 0.6 and about 1.2 grams per 10 minutes.

8. A multilayer polyethylene film according to claim 1 wherein said low pressure, low density polyethylene has a density of between about 0.916 and about 0.923 grams per cubic centimeter.

9. A multilayer polyethylene film according to claim 1 wherein said low pressure, low density polyethylene is present in said second outer layer in an amount of between about 16 percent and about 22 percent by weight based on the weight of said second outer layer.

10. A multilayer polyethylene film according to claim 1 wherein said first outer layer contains at least about 82 percent by weight of said high pressure, low density polyethylene.

11. A multilayer polyethylene film according to claim 1 wherein said first outer layer contains less than about 12 percent by weight of low pressure, low density polyethylene.

12. A multilayer polyethylene film according to claim 1 wherein the thickness ratio of said second outer layer to said first outer layer is between about 1.5:1 and about 2.5:1.

13. A multilayer polyethylene film according to claim 1 wherein the total thickness of said film is between about 1.3 and about 1.8 mils.

14. A multilayer polyethylene film according to claim 1 wherein said low pressure, low density polyethylene comprises a copolymer of ethylene and butene-1.

15. A multilayer polyethylene film according to claim 1 wherein said low pressure, low density polyethylene comprises a terpolymer of ethylene, hexene-1, and either propylene or butene-1.

16. A multilayer polyethylene film according to claim 1 wherein said film is formed into a bag.

17. A bag comprising a melt-extruded multilayer polyethylene film wherein said film consists essentially of a first outer layer containing at least about 75 percent by weight, based on the weight of said first outer layer, of high pressure, low density polyethylene, and at least a second outer layer comprising a mixture of high pressure, low density polyethylene and low pressure, low density polyethylene, said high pressure, low density polyethylene and said low pressure, low density polyethylene having a density below about 0.93 grams per cubic centimeter.

18. A bag according to claim 17 wherein said low pressure, low density polyethylene is present in said second outer layer in an amount of less than about 25 percent of weight based on the weight of said second outer layer.

* * * * *